Feb. 21, 1939.                R. H. KINGDON                2,148,237
                              TROLLEY DUCT GATE
                              Filed Dec. 13, 1935
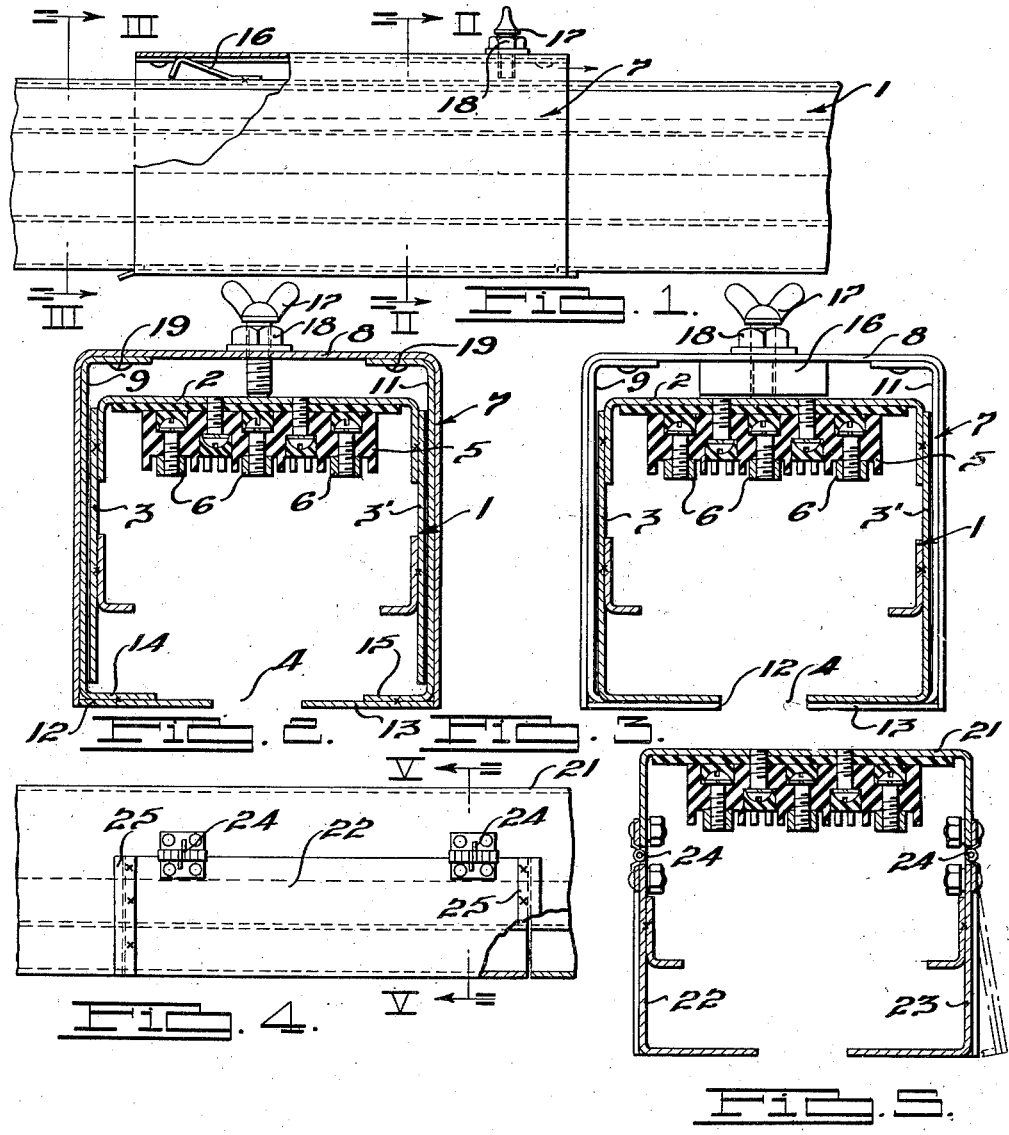
INVENTOR
Ralph H. Kingdon.
BY Myron J. Seibold
ATTORNEY Patented Feb. 21, 1939

2,148,237

UNITED STATES PATENT OFFICE 2,148,237

TROLLEY DUCT GATE

Ralph H. Kingdon, Detroit, Mich., assignor to Square D Company, Detroit, Mich., a corporation of Michigan Application December 13, 1935, Serial No. 54,213

7 Claims. (Cl. 191—28)

This application relates to a trolley current distribution system and more particularly to a trolley duct and means therein providing entrance for the current collector trolley.

In trolley current distribution systems of the enclosed type it has become common practice to mount the bus bars within an enclosed duct having only a restricted opening in one wall thereof and to take current from a trolley supported within the duct and having rollers cooperating with the bus bars therein. This results in a system of mobile electric circuits which eliminates the inconvenience and danger of long and unwieldy cords and cables ordinarily used to supply power to portable tools attached to fixed points. Heretofore, an insertion has either taken place at the end of a duct or the trolley was formed with a restricted length so that when rotated 90 degrees it would pass through the slot in the bottom of the duct. Both of these procedures are obviously undesirable as the duct may be of extreme length and having a large number of trolleys so that the removal of any particular trolley from the end of the duct becomes impractical. The insertion of the trolley through the slot in the bottom of the wall of the duct obviously places almost insurmountable limitations in the way of design for a suitable trolley.

One object of the present invention is to provide trolley entrance means whereby the trolley may be inserted in or removed from a trolley duct at a number of spaced points throughout its length.

Another object of this invention is to provide a trolley duct wherein a portion of the tracks may be readily removed and replaced to permit insertion or removal of the trolley.

Another object of this invention is to provide a trolley duct entrance means which may be rigidly secured in place but which is readily manipulable to permit passage of the trolley into or out of the duct.

Another object of the invention is to provide a trolley duct entrance means which may be placed anywhere in a duct system in any desired number and in which the removal of the trolley may be quickly and easily accomplished by the temporary removal of part of the trackway.

Other objects and features of the invention will be readily apparent to those skilled in the art from the following specification and appended drawing illustrating certain preferred embodiments of the invention in which:

Figure 1 is a side elevational view of a trolley duct having an entrance or gate in accordance with the present invention.

Figure 2 is an enlarged sectional view taken on the line II—II of Figure 1.

Figure 3 is an enlarged sectional view taken on the line III—III of Figure 1.

Figure 4 is a side elevational view of a modified form of trolley duct entrance means.

Figure 5 is an enlarged sectional view taken on the line V—V of Figure 4.

The preferred form of applicant's trolley duct gate or entrance means is illustrated in Figures 1 to 3, inclusive, wherein is shown a portion of a duct section 1 composed of an upper U-shaped angle member 2 having welded thereto two depending L-shaped angle members 3 and 3' forming a generally rectangular duct having an elongated slot 4 throughout its bottom wall. Against the inner surface of the member 2 are mounted a plurality of insulating blocks 5, supporting bus bars 6 with which the collector rollers of a suitable trolley, not shown, are adapted to cooperate in supplying current to a portable tool or other translating device. The bases of the L-shaped members 3 and 3' which compose the bottom wall of the duct also constitute trackways for the supporting wheels of the trolley and along which these wheels roll as the trolley is moved along the duct.

Whenever an entrance into a duct section is desired for the insertion or removal of a trolley, the slot 4 may be enlarged by entirely cutting away the trackways formed by the bases of the L-shaped members 3 and 3' to remove the bottom wall of the duct for a portion of its length sufficient to permit passage of the trolley. Through this enlarged opening the trolley may be readily passed upward into the duct and upon longitudinal movement will roll along its trackway with the collector rollers engaging the bus bars within the duct. To thereafter close the entrance into the duct, a gate 7 is provided. This is of generally C-shape and is formed of a large inverted U-shaped angle member 8 having U-shaped angle members 9 and 11 attached thereto as shown in Figure 2, by welding, riveting or any other means desired. Plates 12 and 13 are welded to the lower legs of the members 9 and 11 and extend slightly beyond these members as shown in Figure 1 and constitutes stops for properly positioning the gate. The lower legs 14 and 15 of the members 9 and 11 constitute trackways for the trolley and replace the portion of the trackway which was removed by the cutting away of the bases of the L-shaped members 3 and 3'.

Upon the top of the duct there is welded, or otherwise secured, an inclined plate 16 adapted to raise one end of the gate into closed position. Into the opposite end of the gate is threaded a wing bolt 17 having a locking nut 18 thereon for the purpose of raising the opposite end of the gate to secure it in position. As shown in Figures 1 to 3, inclusive, the gate is in its closed position with the bases 14 and 15 constituting extensions of the bottom wall of the duct and providing a smooth trackway for the trolley supporting rollers. To remove the gate to permit entrance or removal of the trolley, the locking nut 18 is loosened and the wing bolt 17 rotated counterclockwise whereupon the right-hand end of the duct, as viewed in Figure 1, is lowered until that end of the legs 14 and 15 clear the bottom wall of the duct. In this position the entire gate 7 may be slid to the right whereupon the left-hand end of the gate slides along the inclined plane 16 and also lowers that end of the gate track away from the bottom wall of the duct. The gate, therefore, now loosely surrounds the duct 1 and may be readily slid therealong to entirely uncover the entrance to the duct. To facilitate this sliding movement, rivet heads 19 may be placed on the underside of the gate to provide smooth sliding surfaces therefor.

To close the gate it is pushed to the left whereupon the left-hand end of the gate rides up the inclined plane 16 and pulls the left end of the extension of the plates 12 and 13 into tight engagement with the outside of the bottom wall of the duct. The wing bolt 17 is then rotated clockwise until the right-hand extension of the plates 12 and 13 is also pressed against the duct whereupon the locking nut 18 may be tightened and the gate is then rigidly secured to the duct. The gate trackways 14 and 15 have the same length as the cutout portions of the bottom wall of the duct and result in providing a continuous smooth track for the trolley.

A modified form of applicant's invention is shown in Figures 4 and 5 wherein the duct 21 is shown of a single formed piece having L-shaped portions 22 and 23 of its lower side walls and bottom wall cut out to permit entrance of the trolley. These cutout portions are then hingedly mounted upon the duct by spring pressed hinges 24. Plates 25 may be welded to the ends of these pieces to limit the inner swinging movement thereof. In this form the pieces are kept in their normal position by the spring hinges which may be strong enough to overcome any sideward force exerted by the trolley. In this type of entrance the sections may be manually swung outward, permitting the trolley to readily drop through the opening thus formed by the removal of the bottom wall. This swinging movement may be accomplished either by directly gripping the sections if within reach, or by engaging them with a manipulating rod or other means.

While this modification (Figures 4 and 5) has utilized only the spring pressed hinges 24 to maintain the cutout sections in place, it is obvious that any conventional form of latching means may be used to positively maintain them in place, if desired.

It is readily understood that the duct entrances and gates herein disclosed may be placed in any desired number along a duct system by including in the system the proper number of gated and ungated duct sections.

While certain embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In combination with a trolley duct having tracks and a slot at a bottom wall thereof and an intermediate trolley entrance provided by cutting away said tracks to create an enlargement of said slot, fill-in parts for replacing the cut-away parts of the tracks to preserve their continuity, and means carrying said fill-in parts, said means being slidable longitudinally of said duct to uncover said trolley entrance.

2. In combination with a trolley duct having a slot in a wall thereof adapted to provide clearance for means leading to a trolley within the duct and an intermediate trolley entrance provided by cutting away said wall to provide an enlargement of said slot, means for covering said cut-away parts, said means being supported on the duct and movable longitudinally thereof to uncover said trolley entrance.

3. In a trolley duct adapted to enclose bus bars and having a bottom wall provided with tracks adapted to support a trolley within the duct and a longitudinal slot in the bottom wall receiving a part movable with said trolley, a trolley entrance provided by cutting away parts of said bottom wall to provide an enlargement of said slot, fill-in parts for replacing the cut-away parts of the wall to preserve its interior continuity, and supporting means for said parts movable longitudinally toward and away from said cut-away portions and vertically into alignment with said wall.

4. In a trolley duct having tracks and a slot at a bottom wall thereof and an intermediate trolley entrance provided by cutting away said tracks to create an enlargement of said slot, fill-in parts for replacing the cut-away parts of said tracks to preserve their continuity, and a longitudinally extending, C-shaped member supporting said parts, said member being disposed around said duct and slidable longitudinally thereof to uncover said entrance.

5. In a trolley duct having tracks and a slot at a bottom wall thereof and an intermediate trolley entrance provided by cutting away said tracks to create an enlargement of said slot, fill-in parts for replacing the cut-away parts of said tracks to preserve their continuity and a longitudinally extending, C-shaped member supporting said parts, said member being disposed around said duct and slidable longitudinally thereof to uncover said entrance, stationary means to raise one end of said member to align said fill-in with said tracks and means movable with said member to raise the other end of said member to align said fill-in parts with said tracks.

6. In a trolley duct having tracks and a slot at a bottom wall thereof and an intermediate trolley entrance provided by cutting away said tracks to create an enlargement of said slot, fill-in parts for replacing the cut-away parts of said tracks to preserve their continuity, and a longitudinally extending, C-shaped member supporting said parts, said member being disposed around said duct and slidable longitudinally thereof to uncover said entrance, stationary means to raise one end of said member to align said fill-in parts with said tracks and means movable with said member to raise the other end of said member to align said fill-in parts with said tracks, said last mentioned means serving to securely lock said fill-in parts in their track-aligning position.

7. In a trolley duct having tracks and a slot at a bottom wall thereof and an intermediate trolley entrance provided by cutting away said tracks to create an enlargement of said slot, fill-in parts for replacing the cut-away parts of said tracks to preserve their continuity, and a longitudinally extending, C-shaped member supporting said parts, said member being disposed around said duct and slidable longitudinally thereof to uncover said entrance, stationary means to raise one end of said member to align said fill-in parts with said tracks and means movable with said member to raise the other end of said member to align said fill-in parts with said tracks, said first mentioned means comprising an inclined surface on which the cooperating end of said member rides in the final stages of its closing movement.

RALPH H. KINGDON.